Oct. 19, 1971 C. W. LAPINSKI 3,613,481
REINFORCED CASE FOR AN AUTOMATIC TRANSMISSION
Filed Nov. 24, 1969 5 Sheets-Sheet 2
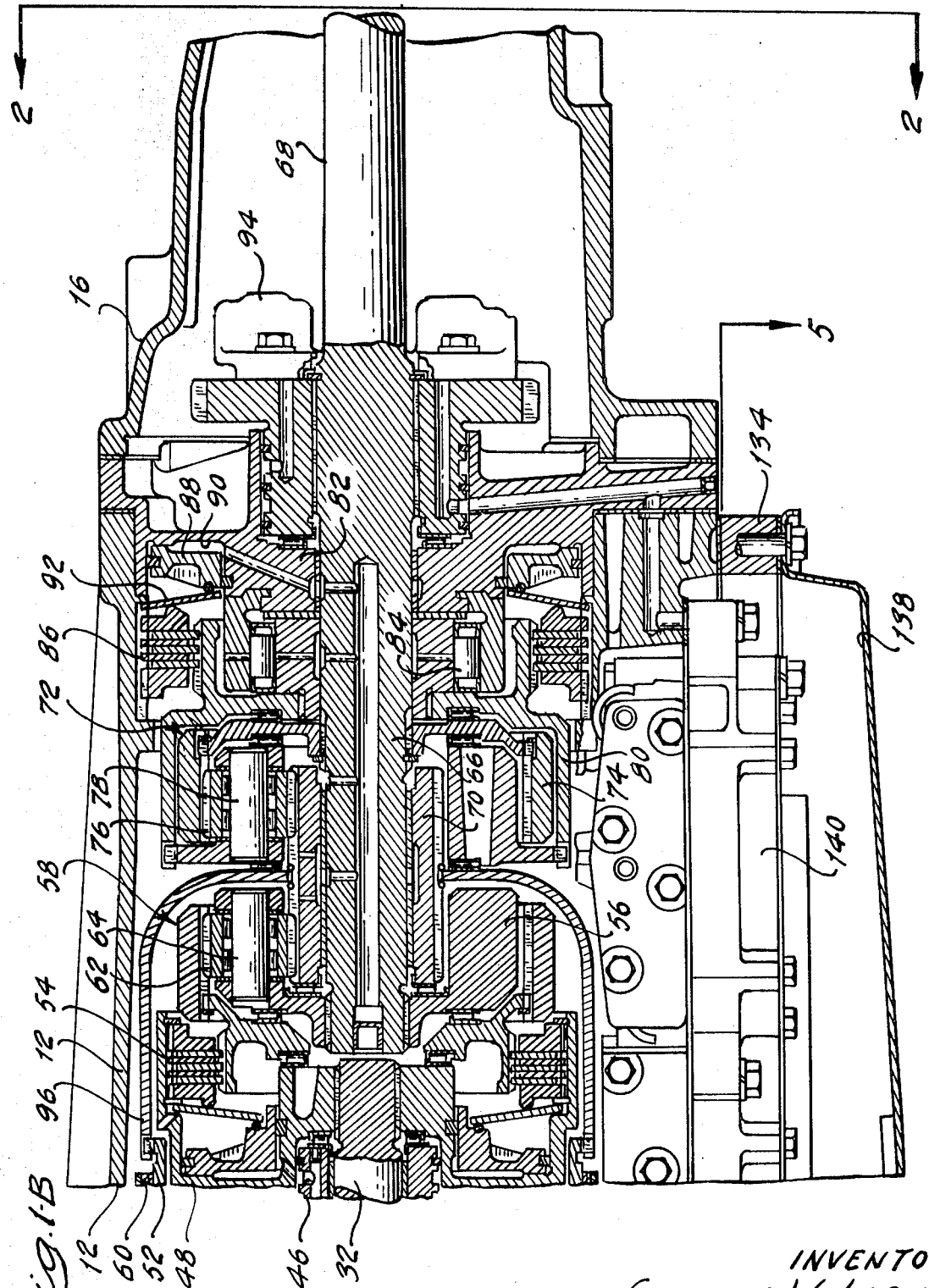
INVENTOR:
CHARLES W. LAPINSKI
BY:
ATTORNEYS

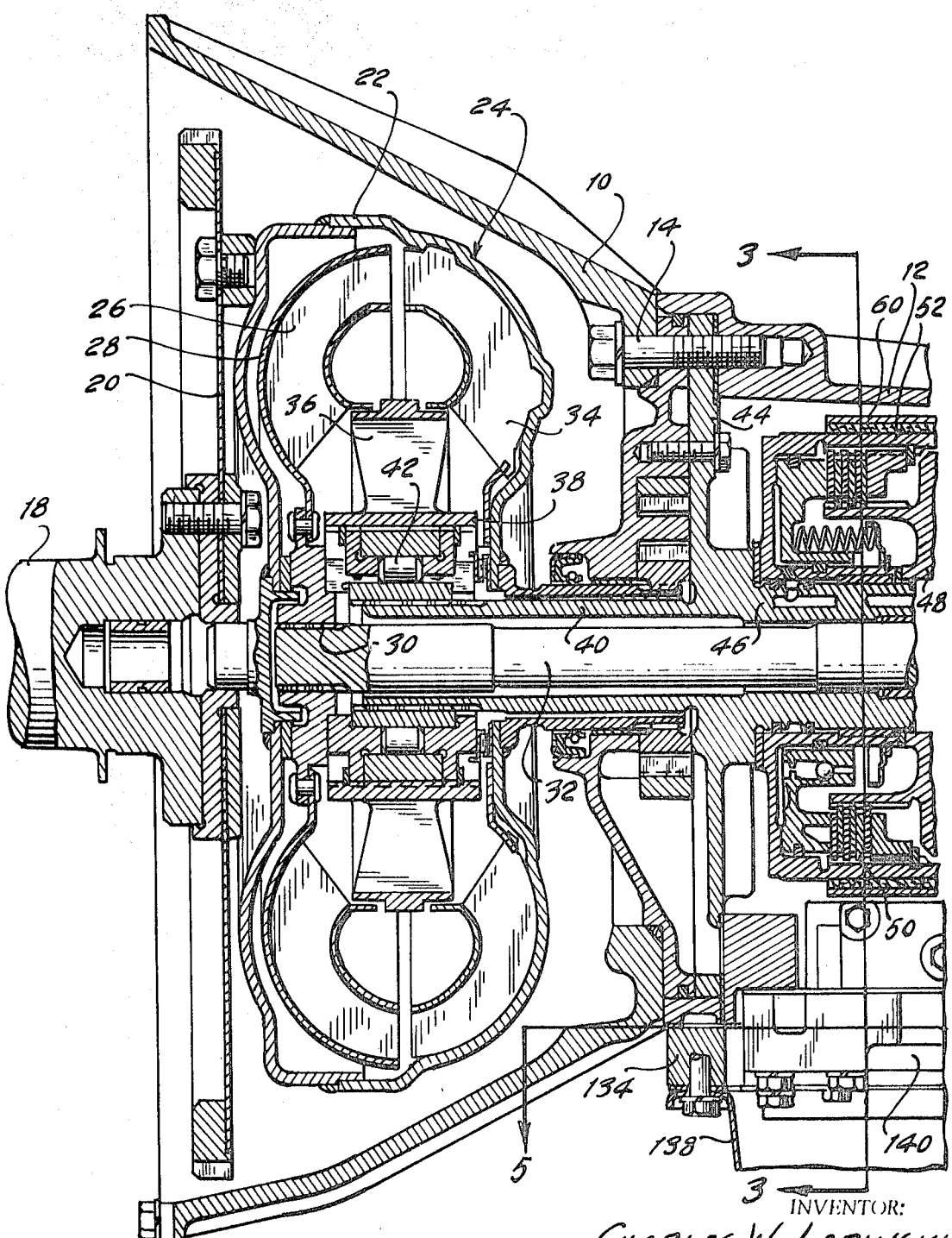

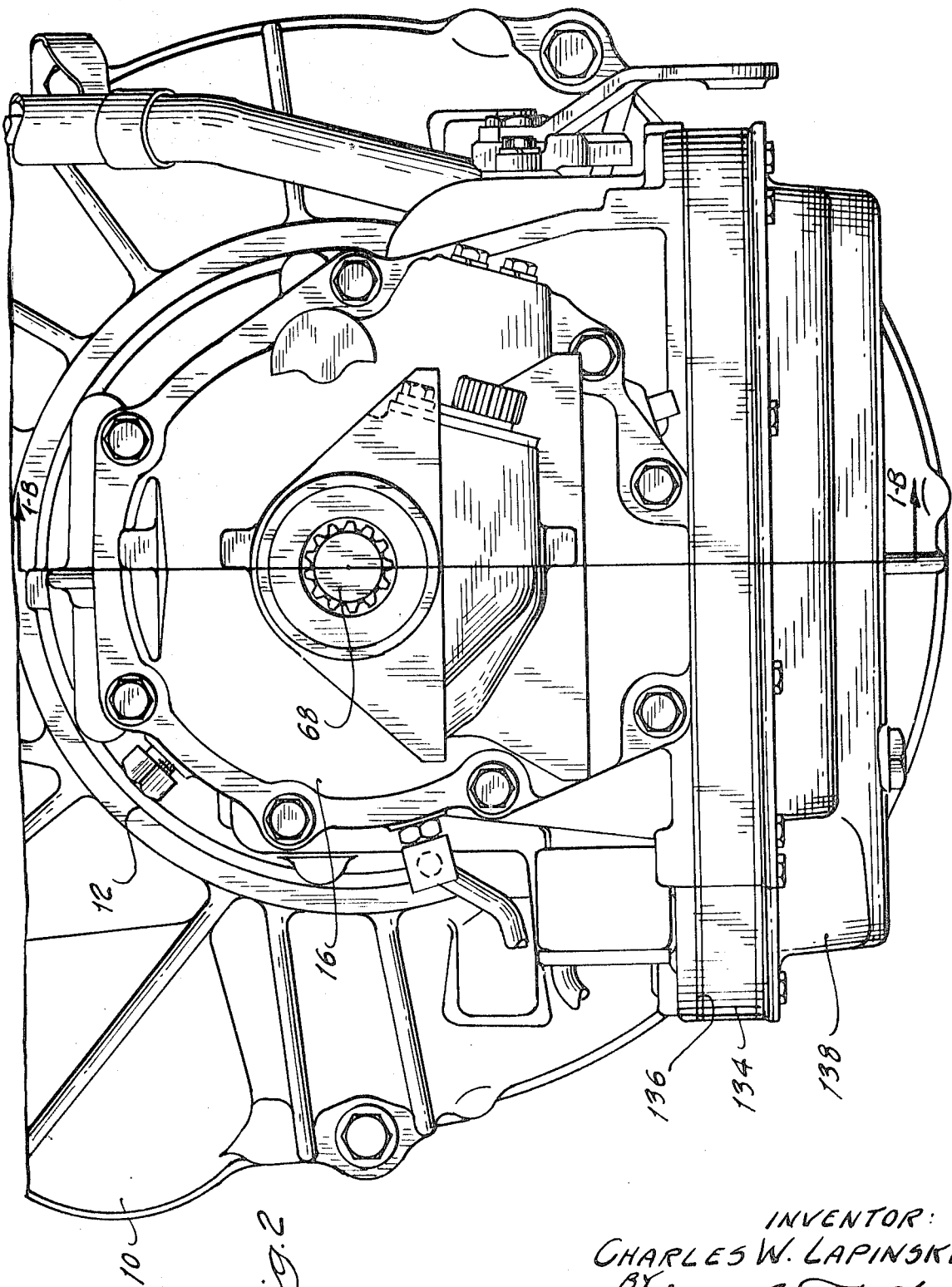

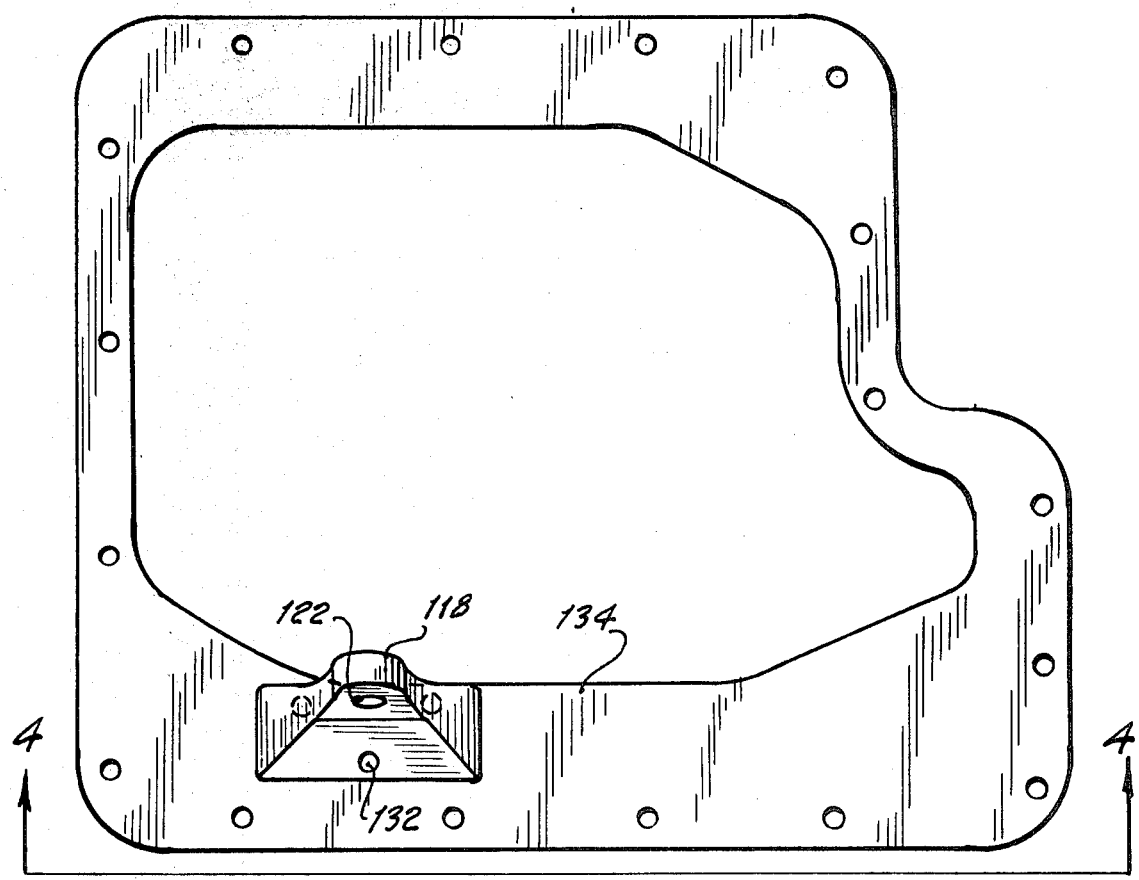
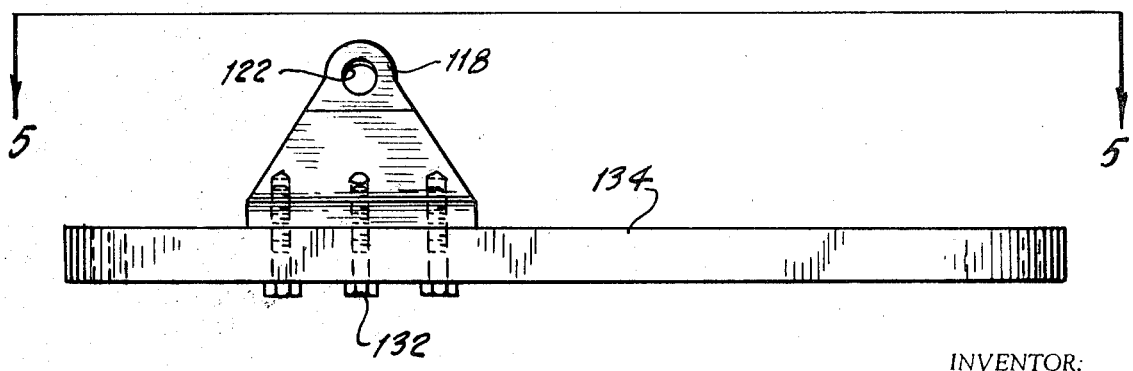

United States Patent Office 3,613,481
Patented Oct. 19, 1971

3,613,481
REINFORCED CASE FOR AN AUTOMATIC TRANSMISSION
Charles W. Lapinski, Westland, Mich., assignor to Ford Motor Company, Dearborn, Mich.
Filed Nov. 24, 1969, Ser. No. 879,468
Int. Cl. F16d 65/06; F16h 57/08
U.S. Cl. 74—753                    2 Claims

ABSTRACT OF THE DISCLOSURE

A case for an automatic power transmission in an automotive vehicle driveline, said transmission including a reaction brake band for selectively anchoring a torque reaction gear element in the transmission, a stiffener plate secured to the base of the transmission, a reaction shoulder bolted to said torque reaction plate and means for transferring torque reaction from the brake band to the case through the stiffener plate thereby avoiding flexure of the case.

GENERAL DESCRIPTION OF THE INVENTION

The improvements of my invention are adaptable for use with automotive vehicle power transmission mechanisms having a torque transmitting gear case bolted to the engine block of an internal combustion engine. The crankshaft of the engine may be connected to torque input gear elements of the transmission gearing through a friction-type neutral clutch or through a hydrokinetic unit such as a torque converter or a fluid coupling. The power output gear elements of the gearing are connected to the vehicle traction wheels through a suitable drive shaft and differential-and-axle assembly. Clutches and brakes, which form a part of the transmission system, may be engaged and released to establish two gear ratio changes.

The brakes in many instances are band brakes, which surround a brake drum connected to a reacting gear element. When the brakes are applied the torque reaction acting on that gear element is transferred to the transmission case through a brake band anchor connected to the case. Under extreme torque transfer conditions this causes flexure of the transmission case. In some instances this leads to structural failure of the transmission case.

The improvements of my invention overcome this overstressing problem by employing a reinforcing plate which may be bolted to the lower side of transmission case. The plate is adapted to distribute reaction loads uniformly through a relatively large portion of the transmission case rather than allowing the reaction forces to be localized. The reaction forces developed by the brake band when it is applied are distributed to the reinforcing plate through an anchor assembly secured to the plate within the transmission casing itself.

An automatic control valve system normally is used for controlling the application and releases the clutches and the brakes. This system comprises a valve body which may be secured by bolts to a lower region of the transmission case. If the transmission case is allowed to deflect because of the distribution of reactive forces, it is possible for the valve body to be deflected thereby causing erratic operation of the valves within the valve body. This problem also is avoided by using the improved reaction torque distribution means of my invention.

PARTICULAR DESCRIPTION OF THE INVENTION

FIGS. 1A and 1B show in longitudinal cross-sectional form an automatic power transmission mechanism for an automative vehicle driveline. This mechanism includes a main transmission case with the reinforcing plate and a brake reaction anchor assembly of my invention.

FIG. 2 is an end view of the transmission of FIG. 1 as seen from the plane of section line 2—2 of FIG. 1.

FIG. 4 is an end view of the structure of FIG. 3 as seen from the plane of section line 4—4 of FIG. 3.

FIG. 5 is a plan view of the reaction plate of FIGS. 1 and 3.

GENERAL DESCRIPTION OF THE INVENTION

Figure 3:
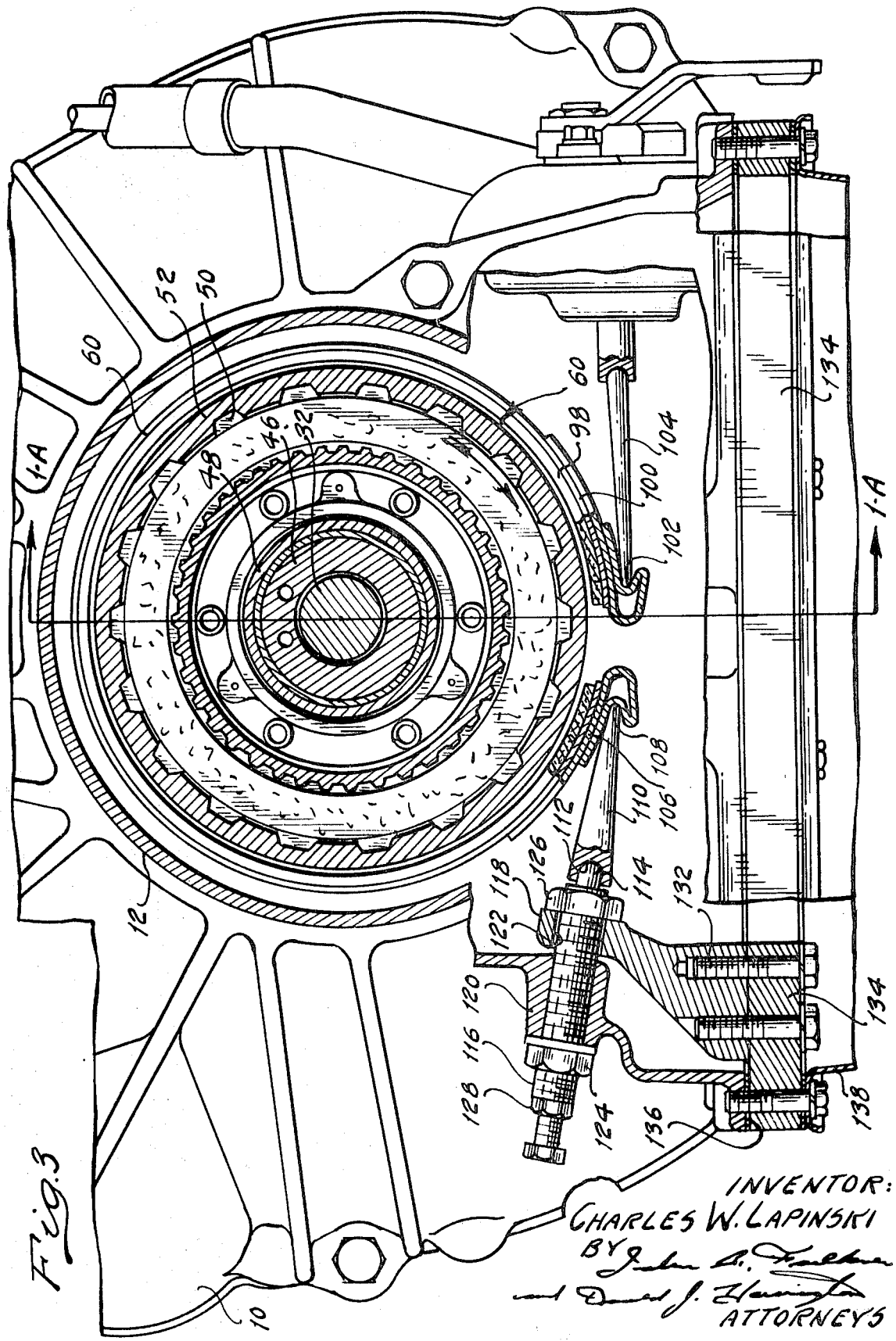
FIG. 3 is an enlarged view of the reaction plate and anchor as seen from the plane of section line 3—3 of FIG. 1.

In FIG. 1, numeral 10 designates a first housing portion in an automatic power transmission mechanism. Numeral 12 designates a main housing portion, which is secured at its left hand margin to the housing portion 10 by means of bolts 14. Numeral 16 designates a tailshaft extension housing which is secured by bolts to the right hand end of the housing portion 12.

The left hand end of the housing portion 10 is adapted to be connected to the engine block of an internal combustion engine in an automotive vehicle driveline. A crankshaft 18 of the engine is drivably connected by means of a drive plate 20 to impeller shell 22 for a hydrokinetic torque converter 24. The converter includes a turbine 26 having an outer shroud 28 connected to turbine hub 30. Hub 30 in turn is splined to turbine shaft 32.

The impeller shell encloses impeller blades 34 which forms radial outflow passages arranged in toroidal fluid-flow relationship with the flow passages defined by the blades of turbine 26. A bladed stator 36 is situated between the flow exit region of the turbine and the flow entrance region of the impeller. It includes a hub 38 which is supported on a stationary sleeve shaft 40. An overrunning brake 42 in the stator hub prevents rotation of the stator in a direction opposite to the direction of rotation of the impeller, but permits freewheeling motion of the stator during coupling operation as the stator rotates in the direction of the impeller motion.

A supporting wall 44 is secured to the left hand margin of the housing portion 12. This forms a clutch support sleeve 46 through which the shaft 32 extends.

Clutch member 48 is drivably connected to the right hand end of the turbine shaft 32. A servo-operated multiple disc clutch assembly 50 is adapted to connect drivably the clutch element 48 to the brake drum 52. A second multiple disc clutch 54 is adapted to connect clutch element 48 to ring gear 56 of a first planetary gear unit 58.

A brake band 60 surrounds the drum 52. This brake band will be described more particularly with reference to FIG. 3.

Planetary gear unit 58 includes, in addition to the ring gear 56, a set of planet pinions 62 journaled rotatably on a carrier 64. This carrier is secured to power output shaft 66, which is integrally connected to transmission stator shaft 68, the latter being journaled rotatably on the extension housing 16.

Gear unit 58 includes also a ring gear 70, which is common to a second planetary gear unit 72. This gear unit includes a ring gear 74 which meshes with a set of planet pinions 76, the latter being journaled rotatably on carrier 78. Ring gear 74 is connected drivably to power output shaft 66. Pinions 76 mesh with the sun gear 70, which is common to the gear unit 58.

The carrier 78 is connected to cross-over member 80, which is supported by a transmission end wall 82 for the main housing or casing 12. An overrunning brake 84 is adapted to distribute reaction torque from the carrier 78 to the wall 82. When the torque is applied in one direction, brake 84 is adapted to permit freewheeling motion of the carrier 78 in the opposite direction.

Carrier 78 is anchored also by a multiple disc friction brake 86 which comprises multiple friction plates connected alternately to the member 80 and the casing 12. The friction plates can be pressed into frictional braking engagement by a servo piston 88 situated in an annular cylinder 90. An annular valve spring 92 acts as a leverage for distributing piston force to the multiple disc elements during brake application. It also serves as a piston return spring when pressure is released from the cylinder 90.

A compound governor valve assembly 94 is connected drivably to the shaft 68.

When the multiple disc clutch 54 is applied, turbine torque is delivered to the ring gear 56. The carrier 64 resists rotation since it is connected to the output shaft 66. This causes sun gear 70 to rotate in a reverse direction, thus imparting a forward driving torque to the ring gear 74 which is distributed to the output shaft 66. This forward driving torque is combined with the forward driving torque applied to the shaft 66 through the carrier 64. As low speed ratio is established, the reaction point for the gearing is the carrier 78 which is anchored against rotation by the brake 86 or by the brake 84.

To initiate a speed ratio change to the intermediate speed ratio, brake band 60 is applied. This anchors drum 52 against rotation. This drum is connected drivably to the sun gear 70 through a drive shell 96. Brake band 60 thus anchors the sun gear 70 so that it can act as a reaction point. The reaction torque of the sun gear 70 is distributed to the casing 12 through the brake band 60. The carrier 78 freewheels since brake 86 is released and since the torque applied in a braking direction through the overlying brake 84 is interrupted.

To establish high ratio operation, brake band 60 has been released and both clutches 50 and 54 are applied thereby locking together the elements of the gear units so that they rotate in unison. This establishes a direct drive connection between the shaft 32 and the shaft 66.

Reverse drive is achieved by releasing the clutch 54 and applying the clutch 50. Brake band 60 is disengaged. Turbine torque is then delivered through the clutch 50 from the shaft 32 to the torque transfer member 96. This drives sun gear 70 in a forward driving direction. Multiple disc brake assembly 86 is applied so that the carrier 78 acts as a reaction point. Sun gear 74 and the output shaft 66 now are driven in a reverse direction.

As seen in FIG. 3, the brake band 60 comprises a main band 98. An anchor member 100 is spot welded or riveted to one end of the band 98. It is bent as shown in FIG. 3 in a reentrant fashion to form a seat 102, which is engaged by one end of strut 104. The other end of strut 104 is engageable by the piston of a fluid pressure operated brake servo (not shown). The other end of the brake band 98 has secured thereto an anchor member 106, which may be welded or riveted to the other end of the band. The direction of the torque applied to the drum 52 when the brake band 60 is applied is indicated by the direction of the arrow in FIG. 3.

Anchor member 106 is bent in a reentrant fashion to form a seat 108 for an anchor strut 110. One end of the strut is recessed as shown at 112 to receive the end of an anchor bolt 114. An adjusting bolt 114 is threaded in an internally threaded sleeve 116. The sleeve is externally threaded also to permit a threaded connection with an internally threaded opening formed in the boss 120, which forms a part of the casing 12. Sleeve 116 extends through an opening 122 formed in anchor block 118. A pair of locking nuts 124 and 126 are threaded fast on the sleeve 116 and hold the sleeve 116 after the proper adjustment on the sleeve 116 with respect to the boss 120 is achieved.

The adjusting bolt 114 has a locking nut 128 engagable with the sleeve 116 to hold the bolt 114 in a proper adjusted position. It can be adjusted to produce compensation for wear in the brake band lining for the brake band 60.

Anchor block 118 is secured by bolts 130 to a support plate 134, which is bolted to the lower surface 136 of the casing 12. The transmission oil pan, which forms a transmission oil sump, is secured to the lower side of the plate 134 as indicated at 138 in FIG. 1. A transmission control valve body 140 is located in the oil sump defined by the pan 138. This control valve body encloses multiple valve elements for the gearing.

The reaction forces for the brake band 60 are distributed through the reaction strut 110 and through nut 126 to the anchor block 118. The reaction forces then are distributed through the support plate 134 to the casing 12 over a relatively large distribution area thereby avoiding flexure at a localized area. The boss 120 is not subjected therefore to the heavy reaction loads that would be experienced if the reaction forces for the brake band were to be distributed directly to the boss 120 from the reaction strut 10.

A suitable gasket material can be used between the surface 136 of the casing 12 and the upper surface of the support plate 134.

The improved reaction distribution means of my invention can be employed in conventional transmission housings without major modifications to the transmission case.

Having thus described a preferred form of my invention, what I claim and desire to secure by U.S. Letters Patent is:

1. A power transmission mechanism comprising gear elements adapted to establish a torque delivery path from a driving member to a driven member, a transmission case enclosing said gear elements, a brake drum connected drivably to one of said gear elements, clutch means for connecting selectively a power input member of said gear elements to said driving shaft, a fluid pressure operated brake servo for applying and releasing a brake band including a piston and a cooperating cylinder, a transmission sump located at the lower region of said case, a support plate secured to the lower region of said case between said case and said sump, a reaction block secured to said support plate, a first brake operating strut connecting an operating end of said brake band to said servo piston, a second reaction strut adapted to be engaged by the opposite end of said brake band, means for distributing directly the reaction forces from said reaction strut to said reaction block and hence to said support plate thereby avoiding distributing of brake reaction forces to said case at a localized area, said force distributing means comprising a threaded sleeve, a threaded opening in said case for receiving said sleeve, an adjustable member received through said sleeve and engageable with said reaction strut on the interior of said case, and a threaded adjusting member secured to said sleeve and engageable with said reaction block whereby reaction forces acting on said reaction strut are transferred to said reaction block and to said support plate.

2. A power transmission mechanism comprising gear elements adapted to establish a torque delivery path from a driving member to a driven member, a transmission case enclosing said gear elements, a brake drum connected drivably to one of said gear elements, clutch means for connecting selectively a power input member of said gear elements to said driving shaft, a fluid pressure operated brake servo for applying and releasing a brake band including a piston and a cooperating cylinder, a transmission sump located at the lower region of said case, a support plate secured to the lower region of said case between said case and said sump, a reaction block secured to said support plate, a first brake operating strut connecting an operating end of said brake band to said servo piston, a second reaction strut adapted to be engaged by the opposite end of said brake band, means for distributing directly the reaction forces from said reaction strut to said reaction block and hence to said support plate thereby avoiding distributing of brake reaction forces to said case at a localized area, said means for distributing reaction forces from said reaction strut to said reaction block comprising a threaded reaction bolt engageable at one end with said reaction strut, adjustable means for distributing reaction forces from said bolt to said reaction block, said adjustable means comprising a threaded sleeve, a threaded opening in said case for receiving said sleeve, said bolt being threadably received through said sleeve and engageable with said reaction strut on the interior of said case, and a threaded adjusting member secured to said sleeve and engageable with said reaction block whereby reaction forces acting on said reaction strut are transferred through said reaction bolt, through said sleeve and through said adjustable member to said reaction block.

References Cited

UNITED STATES PATENTS

| | | | |
|---|---|---|---|
| 2,330,198 | 9/1943 | Banker | 188—77 X |
| 2,678,703 | 5/1954 | Williams et al. | 188—77 |
| 2,694,948 | 11/1954 | McFarland | 188—77 X |
| 2,767,781 | 10/1956 | Farkas et al. | 188—77 |
| 2,901,888 | 9/1959 | Swift | 188—77 X |
| 3,053,115 | 9/1962 | Cartwright et al. | 74—763 X |
| 3,509,783 | 5/1970 | Kuhn | 74—606 |

CARLTON R. CROYLE, Primary Examiner

T. C. PERRY, Assistant Examiner

U.S. Cl. X.R.

74—606 R; 188—77 R